United States Patent
Sengupta et al.

(10) Patent No.: US 10,125,033 B2
(45) Date of Patent: Nov. 13, 2018

(54) SELF-REGENERATING ANION EXCHANGE PROCESS FOR TREATING SHALE GAS FLOWBACK WASTE WATER

(71) Applicant: Lehigh University, Bethlehem, PA (US)

(72) Inventors: Arup K. Sengupta, Bethlehem, PA (US); Michael German, Nottingham, MD (US); Jinze Li, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 283 days.

(21) Appl. No.: 14/883,229

(22) Filed: Oct. 14, 2015

(65) Prior Publication Data

US 2016/0272511 A1    Sep. 22, 2016

Related U.S. Application Data

(60) Provisional application No. 62/134,656, filed on Mar. 18, 2015.

(51) Int. Cl.
  *C02F 1/42*      (2006.01)
  *C02F 5/02*      (2006.01)
  (Continued)

(52) U.S. Cl.
  CPC .............. *C02F 1/42* (2013.01); *B01D 15/363* (2013.01); *B01J 41/14* (2013.01); *C02F 5/02* (2013.01); *C02F 9/00* (2013.01); *C02F 2001/422* (2013.01); *C02F 2101/006* (2013.01); *C02F 2101/101* (2013.01); *C02F 2101/20* (2013.01);
  (Continued)

(58) Field of Classification Search
  CPC ...... C02F 1/42; C02F 5/02; C02F 9/00; C02F 2991/422; C02F 2101/006; C02F 2101/20; C02F 2101/101; C02F 2103/10; C02F 2303/16; C02F 2001/422; B01J 41/02;
  (Continued)

(56) References Cited

U.S. PATENT DOCUMENTS 8,187,890 B2    5/2012  Sengupta
2002/0117431 A1*  8/2002  Jensen ..................... B01J 47/14
                                                  210/134

(Continued)

FOREIGN PATENT DOCUMENTS

WO        2014/055870 A1    4/2014

OTHER PUBLICATIONS

Resources for the Future, Wastewater Characteristics from Marcesllus Shale Gas Development in Pennsylvania, Jun. 2013. [Retrieved on Dec. 5, 2017]. Retrieved from the internet <URL: http://www.rff.org/files/sharepoint/Documents/Events/Seminars/Shale-Gas-June-27/Olmstead-presentation.pdf>.*

*Primary Examiner* — Matthew O Savage
(74) *Attorney, Agent, or Firm* — Saul Ewing Arnstein & Lehr LLP; Domingos J. Silva; Michael Manas

(57) ABSTRACT

The present invention includes an anion exchange method that uses sulfate-containing acid mine drainage (AMD), or any sulfate containing water resource, to remove strontium, barium, and/or radium from contaminated water sources, such as but not limited to hydraulic fracturing waste water, flowback, and/or produced water, without requiring any external regenerant. The removal process may be adopted with any waste water or impaired water source containing sulfate anions.

18 Claims, 14 Drawing Sheets

(51) Int. Cl.

| | | |
|---|---|---|
| *B01D 15/36* | (2006.01) | |
| *B01J 41/14* | (2006.01) | |
| *C02F 9/00* | (2006.01) | |
| *C02F 101/10* | (2006.01) | |
| *C02F 103/10* | (2006.01) | |
| *C02F 101/00* | (2006.01) | |
| *C02F 101/20* | (2006.01) | |

(52) U.S. Cl.
CPC ...... *C02F 2103/10* (2013.01); *C02F 2303/16* (2013.01)

(58) Field of Classification Search
CPC . B01J 41/10; B01J 49/07; B01J 49/57; B01D 15/363
See application file for complete search history.

(56) References Cited

U.S. PATENT DOCUMENTS

| | | | |
|---|---|---|---|
| 2008/0035564 A1* | 2/2008 | Moller | B01J 20/06 210/638 |
| 2010/0282675 A1 | 11/2010 | SenGupta et al. | |
| 2011/0132839 A1* | 6/2011 | Zuback | C02F 9/00 210/638 |
| 2012/0234765 A1 | 9/2012 | SenGupta et al. | |
| 2013/0274357 A1 | 10/2013 | SenGupta et al. | |
| 2016/0257580 A1* | 9/2016 | Fatula | C02F 1/42 |

* cited by examiner

SELF-REGENERATING ANION EXCHANGE PROCESS FOR TREATING SHALE GAS FLOWBACK WASTE WATER

CROSS-REFERENCE TO RELATED APPLICATIONS

The present application claims priority to U.S. Provisional Application No. 62/134,656, filed Mar. 18, 2015, the disclosure of which is incorporated herein by reference in its entirety.

BACKGROUND OF THE INVENTION

The newly developed exploration of shale oil and gas by hydraulic fracturing have decreased the demand for foreign oil and gas, while creating job opportunities and a plentiful clean energy source. However, sourcing water for hydraulic fracturing is challenging due to the high volume requirement in numerous remote locations. However, on a volume-volume ratio, the water-to-oil ratio (WOR) or water-to-oil-equivalent ratio for gas and oil from hydraulic fracturing is low as compared to conventional US oil production. On average, 3-5 million gallons of water are injected per well for hydraulic fracturing, and this water comes mainly from rivers and groundwater aquifers. For both cases, sudden withdrawals of large volumes of water could cause problems to environmental systems. Similarly, high volumes of produced water (generally called "flowback water") comes back during oil and/or gas extraction.

The treatment of flowback water for reuse or disposal is difficult, because it often has high concentrations of total dissolved solids (TDS), environmentally regulated ions (e.g., $Ba^{2+}$, $Sr^{2+}$), and radioactivity (e.g., $Ra^{2+}$). Direct discharge of the flowback water into surface water bodies would cause serious environmental damage, because of the waste water's high amounts of TDS and toxic/hazardous elements. Common treatment processes, such as reverse osmosis (RO) or landfilling, are not suitable for these wastes with high TDS values (3-6 times higher than sea water). Evaporation of the flowback water to solids, with consequent use in landfilling, is not feasible because the produced hazardous and radioactive solids would not pass EPA's Toxicity Characteristic Leaching Protocol (TCLP). Further, using hazardous waste landfills for all crystallized salts would be expensive, with prohibitive transportation costs. Deep well injections, on the other hand, require long distance transportation of very high volumes/weights of hazardous liquids.

There is a need in the art for a clean technology that allows for treating high-TDS waste water, such as Marcellus Shale gas flowback waste water. Such treatment processes technology should yield minimal amounts of water or salt waste without requiring externally added chemicals. The present invention addresses this need.

SUMMARY OF THE INVENTION

The present invention provides a method of desalinizing a primary waste water comprising dissolved divalent cations. The present invention further provides a kit for desalinizing a primary waste water comprising dissolved divalent cations.

In certain embodiments, the method comprises providing an untreated secondary waste water comprising dissolved sulfate ions. In other embodiments, the method comprises contacting the untreated secondary waste water with an ion exchanging medium, whereby the ion exchanging medium is conditioned to sulfate form, and whereby a treated secondary waste water is formed, wherein the treated secondary waste water has a lower concentration of dissolved sulfate ions as compared to the untreated secondary waste water. In yet other embodiments, the method comprises contacting the ion exchanging medium conditioned to sulfate form with an untreated primary waste water comprising dissolved divalent cations, whereby a treated primary waste water is formed, wherein the treated primary waste water has a lower concentration of dissolved divalent cations as compared to the untreated primary waste water.

In certain embodiments, the dissolved divalent cations comprise at least one selected from the group consisting of $Ca^{2+}$, $Mg^{2+}$, $Sr^{2+}$, $Ba^{2+}$, and $Ra^{2+}$.

In certain embodiments, the ion exchanging medium comprises at least one selected from the group consisting of a gel anion exchange polymer, macroporous anion exchange polymer, and inorganic anion exchanger. In other embodiments, the ion exchanging medium comprises a strong base anion exchange polymer. In yet other embodiments, the polymer comprises at least one quaternary ammonium functional group.

In certain embodiments, the untreated primary waste water comprises hydraulic fracturing waste water. In other embodiments, the untreated secondary waste water comprises acid mine drainage.

In certain embodiments, when the treated primary waste water is formed, at least a fraction of the divalent cations form an insoluble sulfate salt. In other embodiments, the insoluble sulfate salt does not form within or on the ion exchanging medium. In yet other embodiments, the insoluble sulfate salt is separated from the treated primary waste water by a method selected from the group consisting of decantation, filtration and centrifugation.

In certain embodiments, the treated primary waste water has lower total dissolved solids (TDS) than the untreated primary waste water.

In certain embodiments, the treated secondary waste water and the ion exchanging medium conditioned to sulfate form are further separated. In other embodiments, the separation is performed using at least one method selected from the group consisting of decantation, filtration and centrifugation.

In certain embodiments, the ion exchanging medium and the treated primary waste water are further separated. In other embodiments, the separation is performed using at least one method selected from the group consisting of decantation, filtration and centrifugation.

In certain embodiments, the volume of the treated primary waste water is approximately the same as the volume of the untreated primary waste water. In other embodiments, the volume of the treated secondary waste water is approximately the same as the volume of the untreated secondary waste water.

In certain embodiments, the ion exchanging medium further comprises at least one metal oxide selected from the group consisting of aluminum, copper, iron, manganese, and zirconium.

In other embodiments, the ion exchanging medium has a higher density than any one of the liquids selected from the group consisting of untreated primary waste water, treated primary waste water, untreated secondary waste water, and treated secondary waste water. In yet other embodiments, the ion exchanging medium further comprises at least one metal oxide selected from the group consisting of aluminum, iron, and zirconium.

In certain embodiments, the treated primary waste water has a lower arsenic concentration than the untreated primary waste water.

In certain embodiments, essentially no additional chemicals are used in at least one step of the method. In other embodiments, essentially no additional chemicals are used in any step of the method.

In certain embodiments, the sequence of steps of providing an untreated secondary waste water comprising dissolved sulfate ions and contacting the untreated secondary waste water with an ion exchanging medium is repeated at least two times using the same ion exchanging medium.

In certain embodiments, the ion exchange medium is in the form of a packed bed within a column.

In certain embodiments, the flows of the primary and secondary water wastes through the ion exchange medium are controlled by mechanical means. In other embodiments, the flows of the primary and secondary water wastes through the ion exchange medium are controlled by gravity filtration.

In certain embodiments, the kit comprises an ion exchanging medium. In other embodiments, the kit comprises instructions for use of a secondary waste water comprising dissolved sulfate ions for conditioning the ion exchanging medium to sulfate form. In yet other embodiments, the kit comprises instructions for use of the sulfate-conditioned exchanging medium to remove at least a portion of the dissolved divalent cations from the primary waste water. In yet other embodiments, the ion exchanging medium comprises at least one selected from the group consisting of a gel anion exchange polymer, macroporous anion exchange polymer, and inorganic anion exchanger.

Compositions and methods defined by the invention were isolated or otherwise manufactured in connection with the examples provided below. Other features and advantages of the invention will be apparent from the detailed description and claims.

BRIEF DESCRIPTION OF THE DRAWINGS

The following detailed description of various embodiments of the invention will be better understood when read in conjunction with the appended drawings. For the purpose of illustrating the invention, certain embodiments are shown in the drawings. It should be understood, however, that the invention is not limited to the precise arrangements and instrumentalities of the embodiments shown in the drawings.

DETAILED DESCRIPTION OF THE INVENTION

Figure 1:
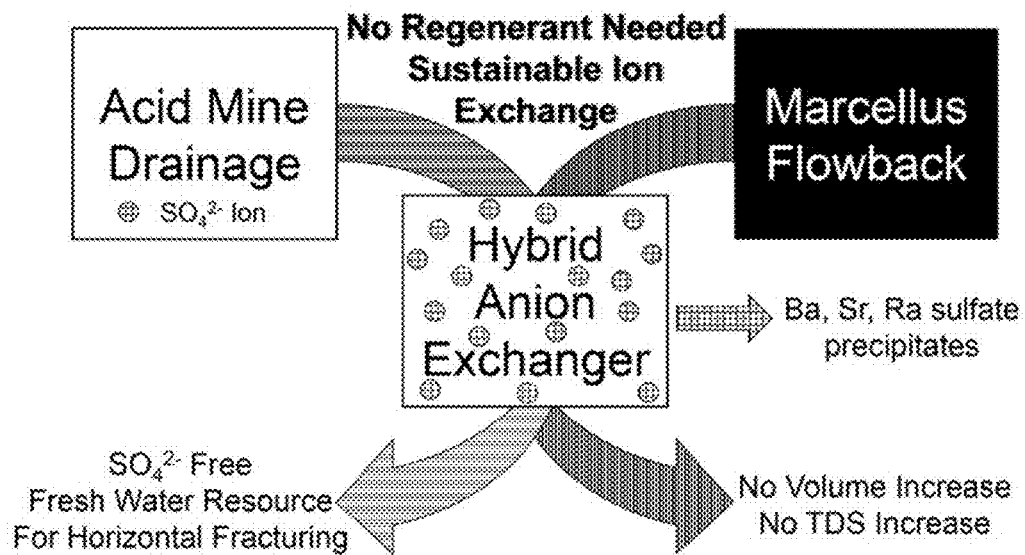
FIG. 1 is a non-limiting schematic of an exemplary anion exchange mediated process useful for treating Marcellus flowback water using acid mine drainage (AMD) or any other sulfate-containing water.

In one aspect, the methods of the invention allow for the partial or substantially total desalinization (also known as desalination, desalinisation or desalting) of waste water, i.e., reduction of total dissolved solids (TDS) from waste water, such as but not limited to Marcellus Shale gas flowback waste water.

Appropriate water sources for hydraulic fracturing are required. AMD waste is a possible water source when hydraulic fracturing is occurring near old mining activities. However, AMD has high concentrations of sulfate and iron ions due to the chemistry of its formation:

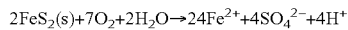

One of the major water quality concerns for water used in hydraulic fracturing fluids is scaling during pumping. Sulfate readily precipitates with $Ca^{2+}$, $Ba^{2+}$, $Sr^{2+}$, and $Ra^{2+}$, thus clogging the pipes and preventing gas or water flow. Thus, finding a low cost means of removing hardness and sulfate from water and/or waste water is important for the shale gas industry.

The simple mixing of Marcellus Shale produced waste water with AMD waste is not feasible, because mixing these streams fails to generate reusable water, and yet generates much higher volumes of water requiring disposal, partially due to the low sulfate content of the AMD.

Addition of sodium sulfate to Marcellus waste water streams for removal of barium, strontium and radium have been proposed, but such method dramatically increases sodium concentration in the treated water stream and requires use of large amounts of sodium sulfate.

As demonstrated herein, anion exchange resins can be used to perform sulfate ion removal from AMD streams, and the sulfate-loaded resins can be used to remove divalent cations from Marcellus Shale waste water. The treated, sulfate-free AMD is usable for future injection for hydraulic fracturing, and the treated toxic/radioactive divalent cation-free produced water has reduced TDS and is safe for downstream treatment and disposal. The solubility product for sulfate salts of radium, barium, and strontium are:

$$K_{SP}(SrSO_4)=2.8\times10^{-7}$$

$$K_{SP}(BaSO_4)=1.1\times10^{-10}$$

$$K_{SP}(RaSO_4)=4.2\times10^{-11}$$

The invention relates in part to sustainable and environmentally friendly methods comprising (i) removing sulfate ion from a secondary waste water stream and (ii) using these sulfate ions for precipitating a divalent cation from a primary waste water stream. In certain embodiments, the secondary waste water comprises sulfate-rich acid mine drainage (AMD), and the primary waste water stream comprises divalent cation-rich water derived from oil and gas operations, including hydraulic fracturing gas wells. The sulfate ion retrieved from the AMD can then be used to remove hazardous cations from the waste water produced by hydraulic fracturing, including barium, strontium, and/or radium. In certain embodiments, the methods of the invention require no addition of external chemicals beyond the two waste streams. In other embodiments, the methods of the invention allow for use of the purified secondary water waste for hydraulic fracturing, and for use of the purified primary water waste, which is essentially free of barium, strontium, and/or radium. Such methods are repeatable for numerous cycles, dependent on the physical and chemical stability of the ion exchanging material.

In certain embodiments, the anion exchange resins useful within the invention are self-regenerated in the process, thus not requiring the use of any externally added chemical as a regenerant. In other embodiments, the volume of the treated waste water is not increased regardless of the sulfate content of the AMD. In yet other embodiments, the sodium content of the treated waste water does not increase and the total dissolved solids (TDS) is partly reduced. In yet other embodiments, the treated AMD, after sulfate removal, is suitable for hydraulic fracturing.

In certain embodiments, the anion exchange medium (such as, but not limited to, a gel anion exchange polymer, a macroporous anion exchange polymer, or an inorganic anion exchanger) is pre-loaded with nanoparticles of hydrated ferric oxides (HFOs), e.g., LayneRT. In other embodiments, the HFOs increase the density of the resin beads. In yet other embodiments, the nanoparticle comprise HFOs and/or hydrated zirconium oxides (HZrOs), both of which form substantially insoluble hydroxides in the pH range of 3.0-12.0 and can selectively remove trace arsenic in the feed solution.

In certain embodiments, stoichiometric amounts of $SO_4^{2-}$, e.g., AMD waste water, are exchanged with $Cl^-$ for treatment/regeneration of the anionic exchanging medium, as illustrated in reaction (1), wherein (em) indicates the exchange medium:

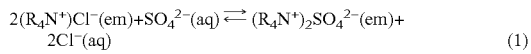

$$2(R_4N^+)Cl^-(em) + SO_4^{2-}(aq) \rightleftarrows (R_4N^+)_2SO_4^{2-}(em) + 2Cl^-(aq) \quad (1)$$

As compared to mixing AMD waste and Marcellus Shale waste water, significantly less waste is formed and the spent regenerant solution (e.g., treated AMD) can be reused as a water resource for drilling and fracturing. The invention requires no use of fresh water during regeneration and the treated secondary waste water (e.g., treated AMD) comprises substantially no sulfate ion.

During the water treatment process, along with the desired divalent metal cations removal, anionic ligands may be removed from the water through Lewis acid-base interactions with the pre-loaded HFO or HZrO nanoparticles on the matrix and macropores of the anion exchanger. In certain embodiments, the use of HFO and/or HZO loaded anion exchange resin allows for excellent As(III) and As(V) removal. In other embodiments, removal of phosphate, natural organic matter, silica and/or transitional metal is also achieved.

When released from the anion exchange functional groups, sulfate ions precipitate with environmentally regulated divalent cations (e.g., $Ba^{2+}$, $Sr^{2+}$), radioactive $Ra^{2+}$ and hardness (e.g., $Ca^{2+}$, $Mg^{2+}$) and separate out from the aqueous phase via the following reactions:

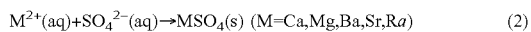

$$M^{2+}(aq) + SO_4^{2-}(aq) \rightarrow MSO_4(s) \ (M=Ca,Mg,Ba,Sr,Ra) \quad (2)$$

Thus, hardness, hazardous, and radioactive divalent cations are removed with an equivalent reduction in chloride concentration. Consequently, the total dissolved solids (TDS) in the treated flowback water is reduced.

In certain embodiments, the flow of water through the exchange medium is controlled by mechanical means. In another embodiment, the flow of the water sample through the exchange medium is controlled by gravity filtration. In yet other embodiments, optimum flow rate is controlled by a pump to control bed expansion and to release all of the precipitation.

In a non-limiting example, an anion exchanger, e.g., a macroporous strong base anion exchange resin (such as, but not limited to, a resin comprising a quaternary ammonium functional group) is changed to $SO_4^{2-}$ form by using a sulfate-containing water source (such as, but not limited to, acid mine drainage or AMD). The anion exchange resin removes and accumulates $SO_4^{2-}$ from the AMD. Then, the high divalent concentration solution (e.g., Marcellus Shale flowback water) is passed through the macroporous anion exchange polymer with an optimum flow scheme to prevent precipitation formation within the bed, avoid increased headloss, and avoid improper fluid dynamics in the bed. Treated AMD is $SO_4^{2-}$ free and can be used as a water source for processes that require no sulfate scaling (such as, but not limited to, hydraulic fracturing and membrane-based desalination).

This technique may serve as a pretreatment for other water or waste water streams (such as, but not limited to, Marcellus Shale flowback water and produced water) to remove radioactive elements (e.g., $Ra^{2+}$) and scaling cations (such as, but not limited to, $Ba^{2+}$, $Sr^{2+}$, $Ca^{2+}$, $Mg^{2+}$). The total dissolved solids (TDS) are removed simultaneously due to formation of precipitation (such as, but not limited to, $RaSO_4$, $BaSO_4$, $SrSO_4$, $CaSO_4$, and $MgSO_4$), which can be removed by common techniques, namely filtration, centrifugation and settling.

The overall schematic of the anion exchange mediated process to treat Marcellus flowback wastewater using AMD or any other sulfate-containing water is illustrated in FIG. 1. Non-limiting exemplary advantages of this invention are as follows: anion exchange resins are self-regenerated in the process (i.e., the method does not require any externally added chemical as a regenerant); the volume of the treated wastewater is not increased regardless of the sulfate content of the AMD; the sodium content of the treated waste water does not increase and the total dissolved solids (TDS) is partly reduced; and the AMD, after sulfate removal, is suitable for hydraulic fracturing.

Definitions

Unless defined otherwise, all technical and scientific terms used herein generally have the same meaning as commonly understood by one of ordinary skill in the art to which this invention belongs. Generally, the nomenclature used herein and the laboratory procedures in analytical chemistry and polymer chemistry are those well known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, the term "AMD" refers to acid mine drainage.

As used herein, the term "instructional material" includes a publication, a recording, a diagram, or any other medium of expression that may be used to communicate the usefulness of the methods of the invention. In some instances, the instructional material may be part of a kit useful for performing the methods of the invention. The instructional material of the kit may, for example, be affixed to a container that contains compositions useful within the methods of the invention or be shipped together with a container that contains such compositions. Alternatively, the instructional material may be shipped separately from the container with the intention that the recipient uses the instructional material and the compositions cooperatively.

As used herein, the term "strong base anion exchange polymer" refers to a polymer comprising a basic group with a pKb value equal to or lower than 3. In one embodiment, the basic group has a pKb value equal to or lower than 2. In another embodiment, the basic group has a pKb value equal to or lower than 1. In yet another embodiment, the basic group comprises a quaternary ammonium group. One skilled in the art will understand that the strong base anion exchange polymers useful within the methods of the invention are not limited to those exemplified herein, but rather include all those strong base anion exchange polymers known in the art and equivalents thereof.

When not otherwise stated, the term "substantially" means being largely, but not wholly, that which is specified.

As used herein, the term "TDS" refers to totally dissolved solids.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. For example, it should be understood that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Example 1

Figure 2:
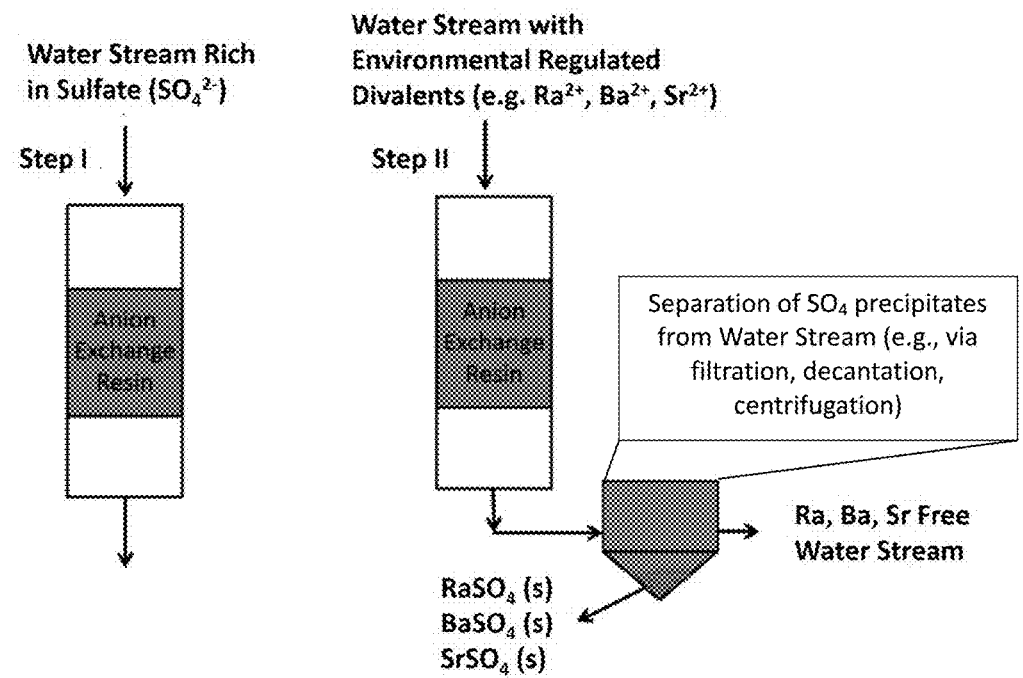
FIG. 2 is a non-limiting schematic of an exemplary method to remove barium, strontium and radioactivity from waste water. In certain embodiments, the method comprises passing sulfate-rich waste water through an anion exchange resin; and subsequently passing toxic and/or radioactive divalent cation-containing waste water through the sulfate-loaded resin.

A non-limiting representative study was conducted to demonstrate the methods of the invention. FIGS. 1-2 illustrate certain aspects of the methods described herein. In certain embodiments, the methods of the invention are more sustainable and environmentally friendly than mixing two water streams. In one aspect, energy is needed for a mixing process, such as stirring and/or bubbling. In another aspect, larger volumes of fluid must be handled by combining two streams. In yet another aspect, the effluent mixed water stream cannot be used as a water resource because of TDS concentrations and/or additional concerns due to the presence of radioactivity.

Figure 3:
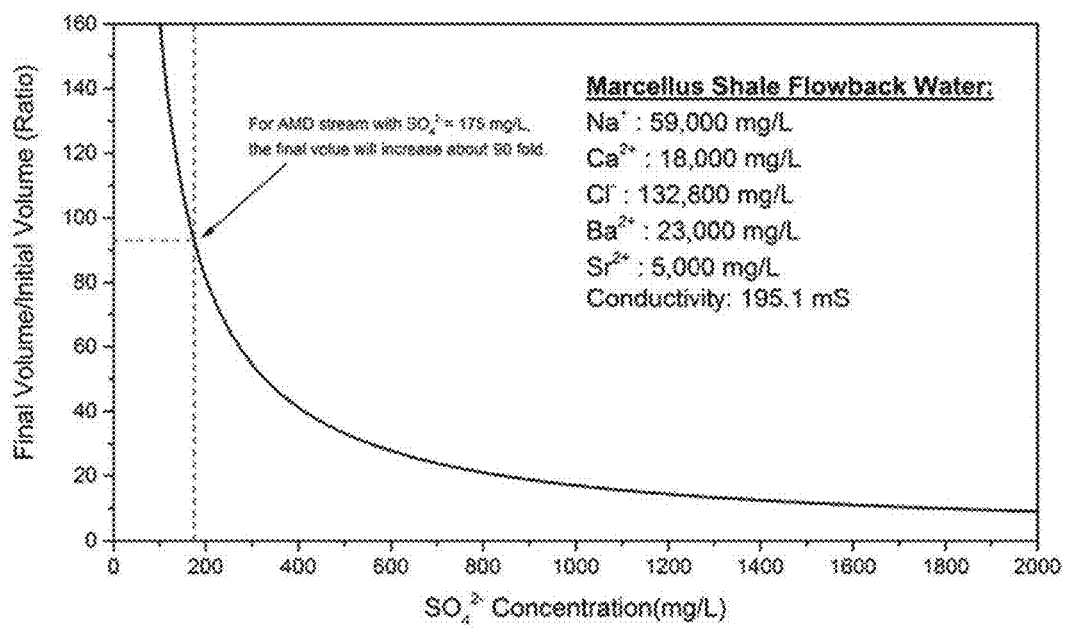
FIG. 3 is an exemplary graph illustrating mixing ratios of hydraulic fracturing flowback water and acid mine drainage (AMD) in order to precipitate divalent cations of concern, based on the sulfate concentration of the AMD. The graph illustrates the high volume mixing ratios required for such task when no anion exchange resin is used.
Figure 4:
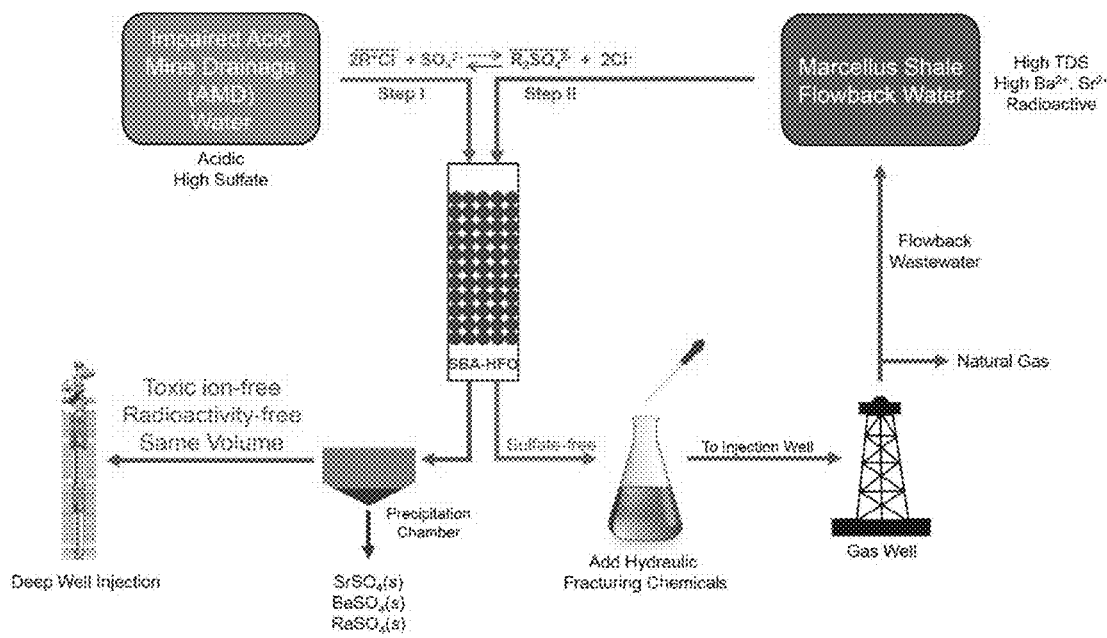
FIG. 4 is a non-limiting illustration of a method contemplated within the invention wherein sulfate-rich acid mine drainage water is passed through a fixed bed column of anion exchange resin column loaded with hydrous ferric oxide (HFO). Marcellus Shale flowback water containing $Ra^{2+}$ is then passed through the same solid phase, and the treated water samples are sampled.

FIG. 3 demonstrates the inefficiency of directly mixing AMD and Marcellus Shale produced water, due at least to the large final volumes required for such treatment.

Figure 5:
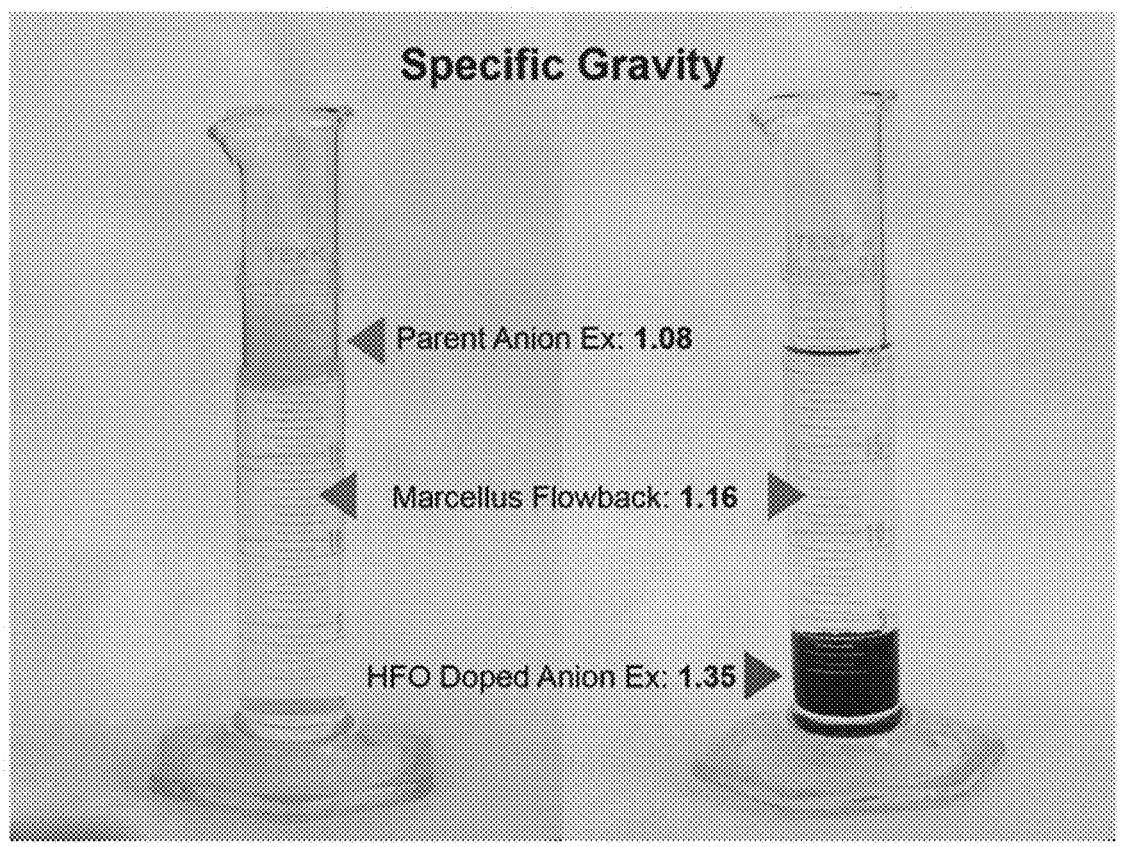
FIG. 5 is a non-limiting illustration of the specific gravities of two exemplary resins and Marcellus Shale flowback water: (left) original A850 resin; and (right) A850 resin loaded with HFO particles. As observed, the original anion exchange resins were less dense than Marcellus Shale flowback water. Preloading of HFO particles into an anion exchange resin increased the density of the beads to a value greater than the density of produced water. This allowed for up-flow pumping of the resin column to wash out any precipitation inside the resin bed without the beads floating out of the bed.

As a consequence of the extremely high total dissolved solids (TDS) of produced water and flowback water from hydraulic fracturing, the specific gravity of this water sample is greater than typical parent ion exchange resins. The resins thus float on top of the water surface. One way to avoid such a problem is to increase the resin's density by loading the resin with metal oxides. FIG. 5 shows that the metal oxide-impregnated ion exchange resins are more dense than the Marcellus Shale flowback and the resin beads thus sink. In contrast, the parent resin beads float in the Marcellus Shale flowback.

Figure 6:
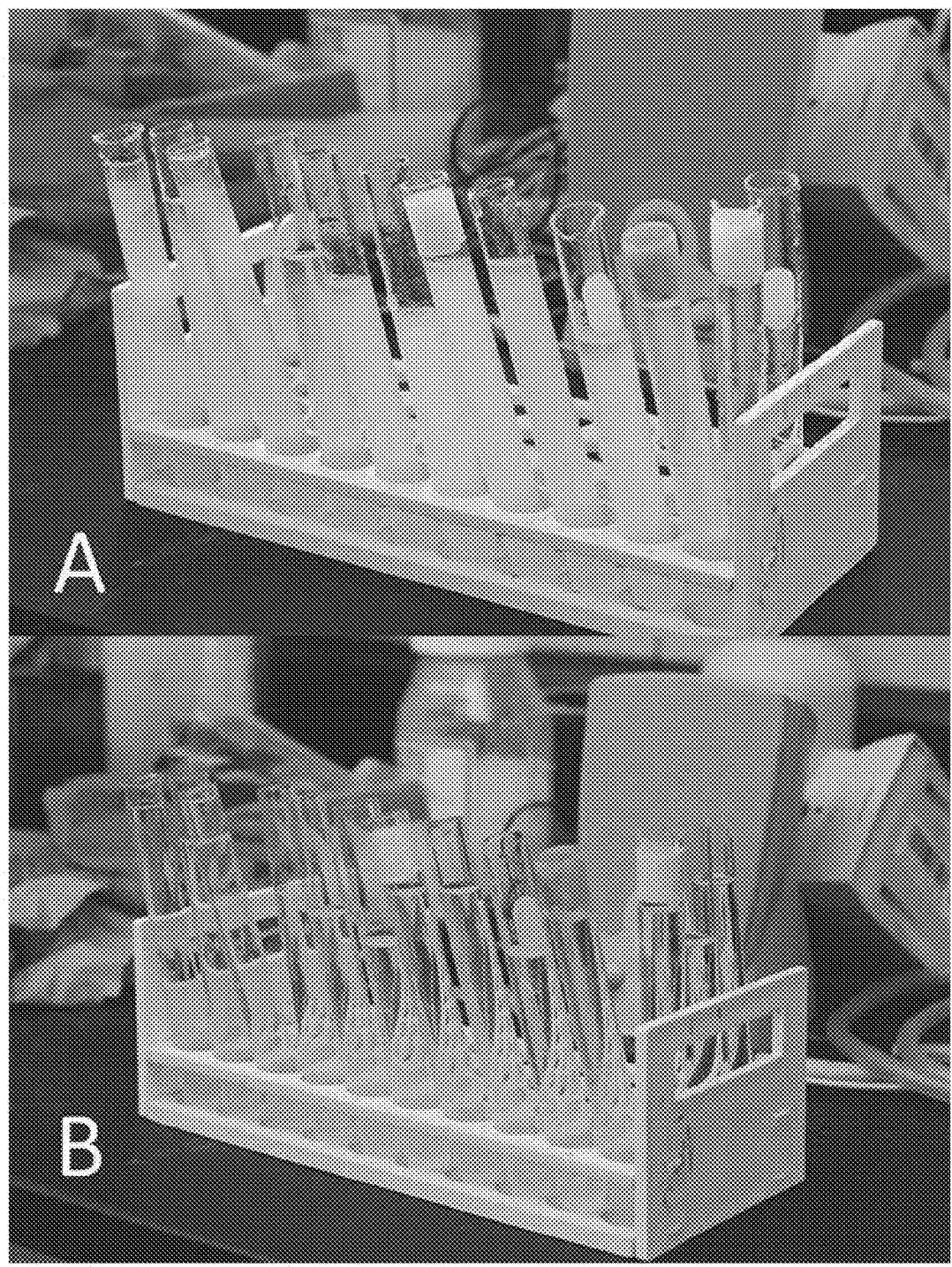
FIG. 6 is a non-limiting illustration of exemplary samples collected after being treated by a bed of HFO-loaded anion exchange material: (A) samples immediately after passing through the column; (B) samples after 20 min settling. Note the efficient settling of the sulfate precipitates.

FIG. 6 demonstrates the settling performance of sulfate precipitation in the effluent outside the column. In this example, a bypass stream could be used to mix high TDS produced water (with radioactive elements) with excess $SO_4^{2-}$ equivalents from the produced water treated by the sulfate-loaded anion exchange resin.

FIGS. 7-15 depict column run effluent histories removal of hardness/arsenic, and partial desalination.

Figure 16:
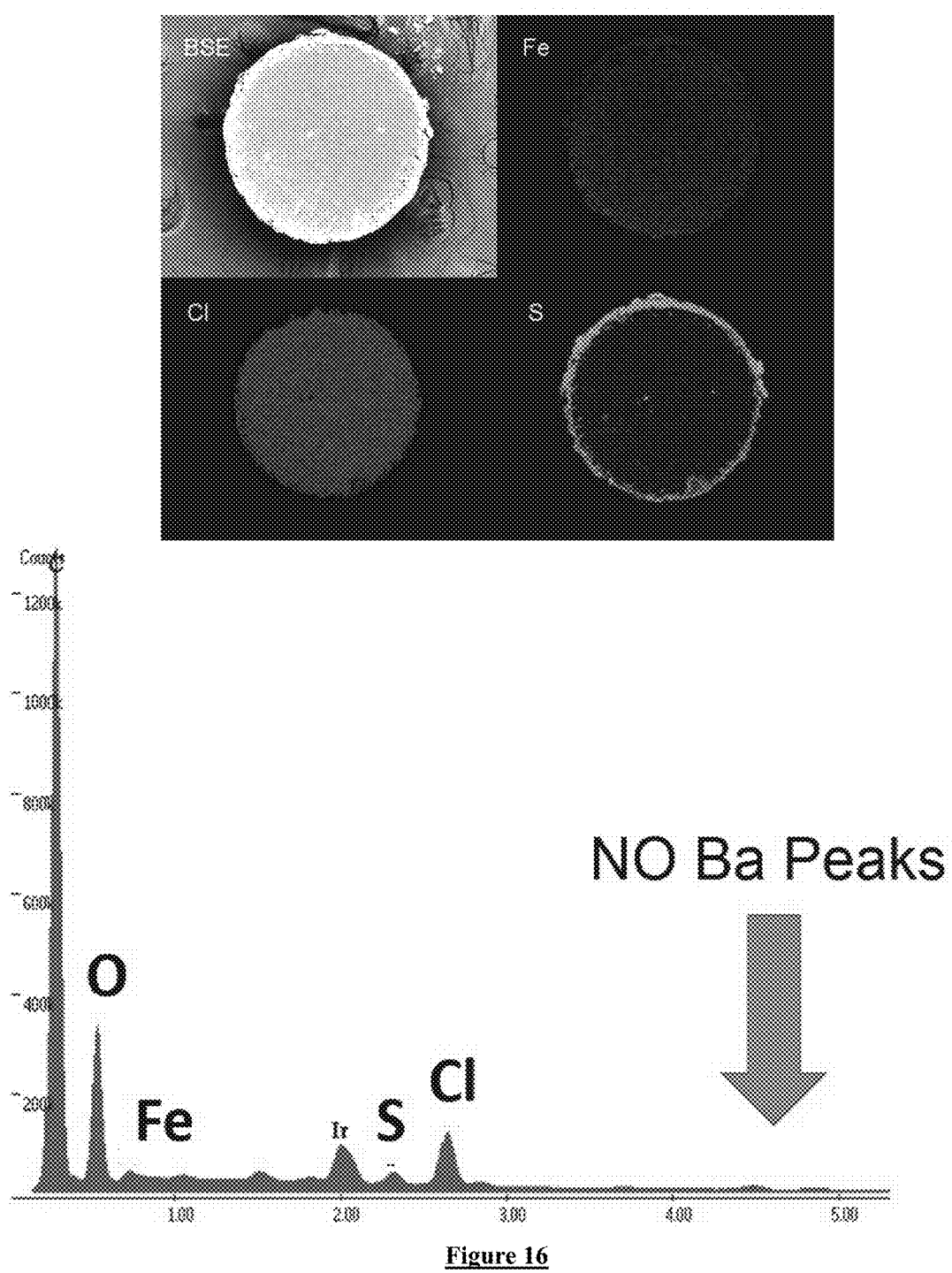
FIG. 16 is a non-limiting illustration of Energy Dispersive X-ray (EDX) mapping (top) and spectrum (bottom) of Purolite A850 loaded with iron oxide after treating flowback water. In the EDX mapping, iron was evenly distributed throughout the resin bead, the resin was nearly completely in chloride form, and there was no sulfate precipitation inside (or on) the resin bead. In the EDX Spectra barium was absent from the resin. BSE corresponds to back scattered electron and is a control for EDX.
Figure 17:
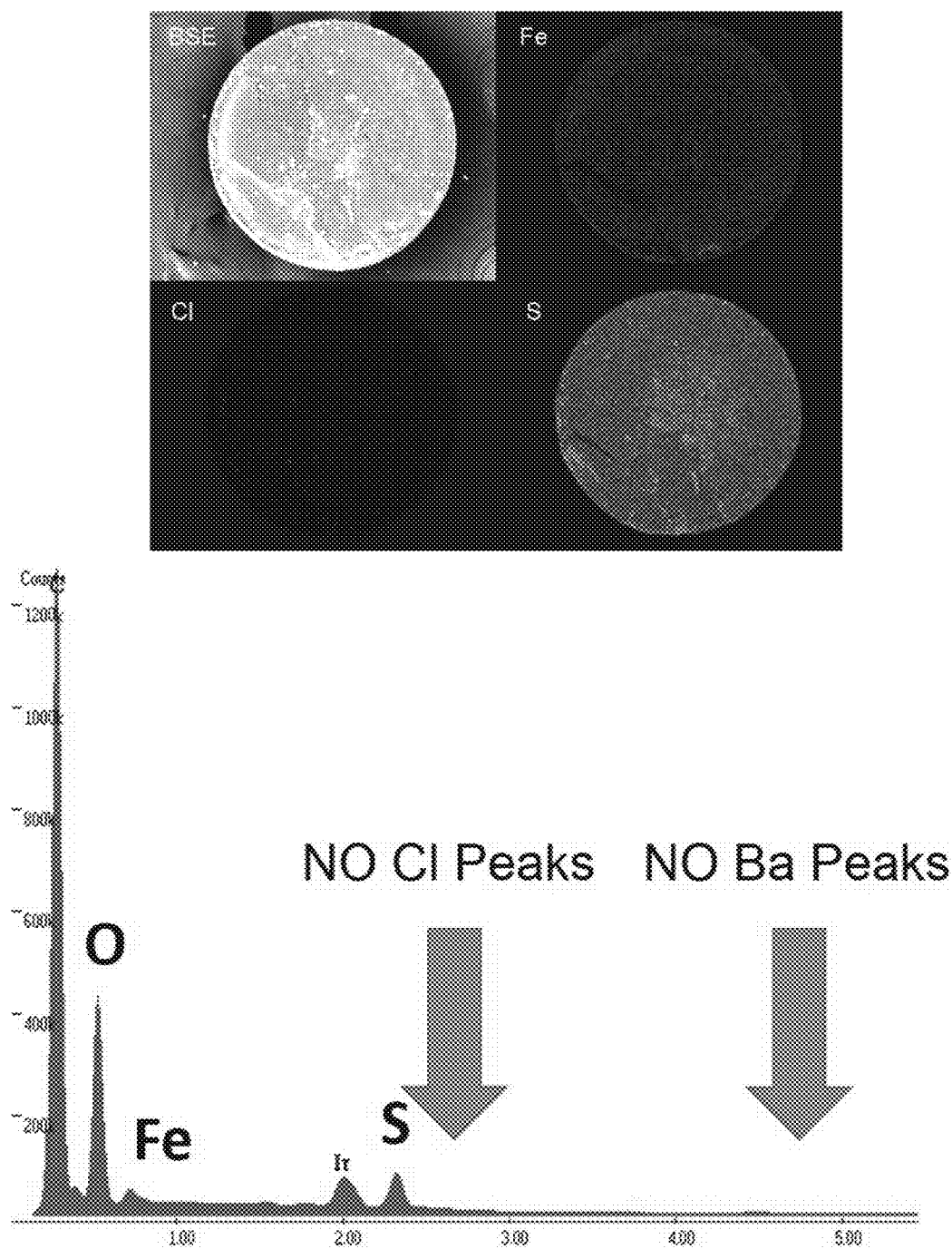
FIG. 17 is a non-limiting illustration of EDX mapping (top) and spectrum (bottom) of Purolite A850 loaded with iron oxide after treating acid mine drainage to become loaded with sulfate. In the EDX mapping, iron was still evenly dispersed throughout the entire resin bead, the resin was no longer in chloride form, but in sulfate form. In the EDX spectrum both chloride and barium were absent. BSE corresponds to back scattered electron and is a control for EDX.

FIGS. 16-17 show chemical analysis of the resin beads via energy dispersive x-ray (EDX) spectroscopy.

Example 2

Two distinct sulfate feed compositions were used in the present Example, in order to evaluate the sulfate loaded hybrid ion exchange process. Macroporous anion exchange polymers with an acrylic matrix and a polystyrene matrix with quaternary ammonium functional groups from the Purolite Company (Philadelphia, Pa.), namely Purolite A850, and from Layne Christensen (Quakertown, Pa.), namely LayneRT were used as the resin material, respectively. The strong base anion exchange resins were first loaded with hydrated ferric oxides (HFOs). Other similar resins may also be used within the present invention.

Flame atomic absorption spectroscopy, conductivity meter, ion chromatography and pH meter were used to measure (i) sodium, calcium and iron ion concentration; (ii) conductivity; (iii) fluoride, aluminum and chloride ion concentration; and (iv) pH, respectively.

Figure 7:
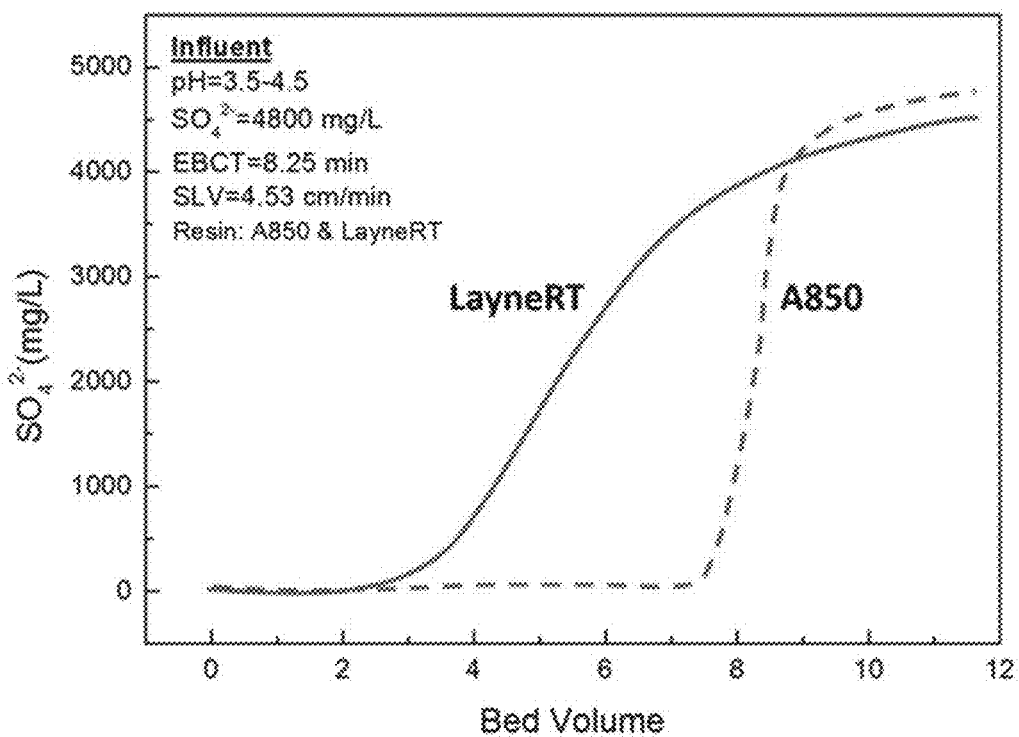
FIG. 7 is an exemplary graph illustrating a comparison of effluent sulfate history for a column loaded or conditioned with high $SO_4^{2-}$ concentration in the feed (4,800 mg/L) during column runs using two different HFO-loaded macroporous strong base anion exchange polymers with polystyrene benzene matrix (LayneRT) and acrylic matrix (Purolite A850) after starting in $Cl^-$ form.

First Set:

The high concentration sulfate solution used to condition the HFO-loaded resins had the following water chemistry: pH 3.5-4.5, $[SO_4^{2-}]$=4,800 mg/L. After sulfate conditioning, the sulfate loaded resins treated influent Marcellus produced water with the following water chemistry: pH 5.3, 4,366 meq/L Cl$^-$, 2,668 meq/L Na$^+$, 1,067.5 meq/L Ca$^{2+}$, 150 meq/L Sr$^{2+}$, and 237 meq/L Ba$^{2+}$. FIG. 7 illustrates the effluent sulfate history during conditioning. The sulfate-rich stream after being passed through the anion exchange resin did not contain any sulfate and can be further reused for other processes such as membrane desalination and hydraulic fracturing water.

Figure 8:
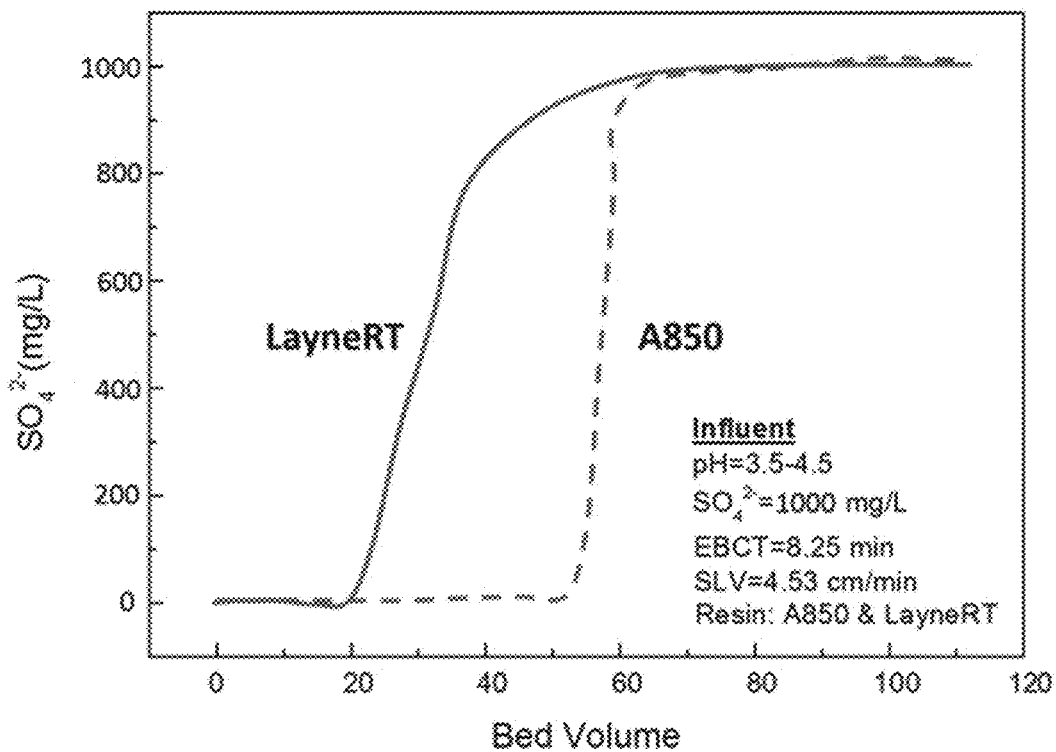
FIG. 8 is an exemplary graph illustrating a comparison of effluent sulfate concentration between LayneRT and HFO-loaded Purolite A850 during conditioning with a moderate concentration sulfate feed (1,000 mg/L).
Figure 9:
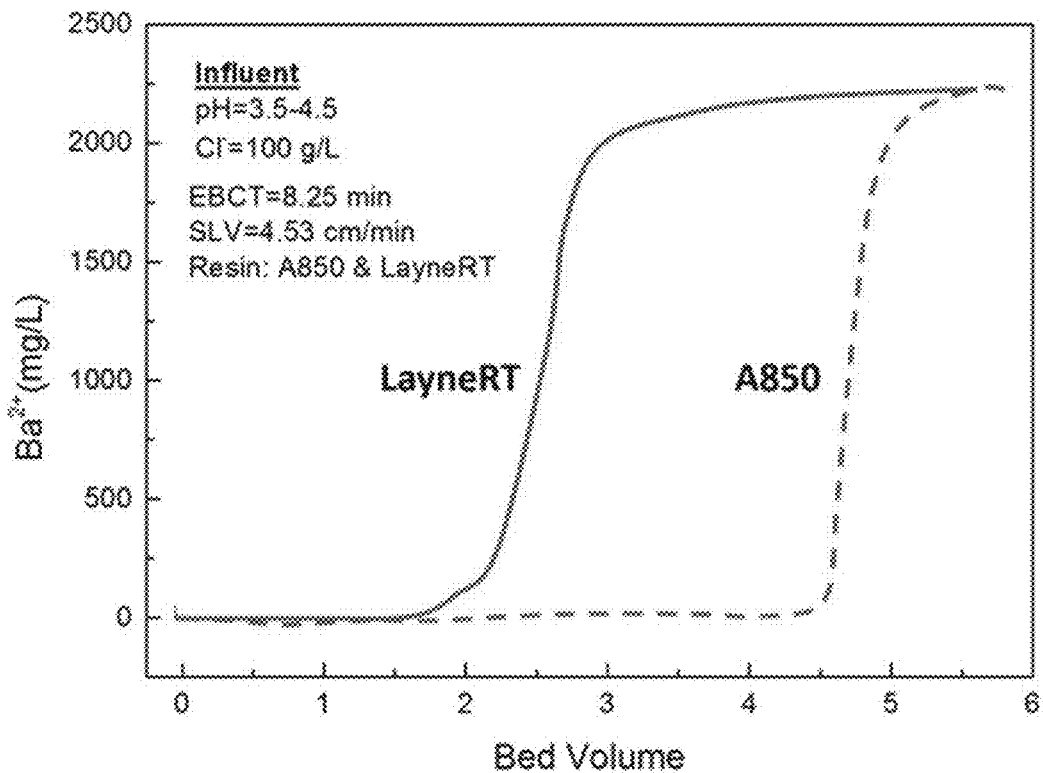
FIG. 9 is an exemplary graph illustrating a comparison of effluent barium history during column operation with Marcellus Shale flowback water (2,200 mg/L $Ba^{2+}$) with two different HFO-loaded macroporous strong base anion exchange polymers with polystyrene benzene matrix (LayneRT) and acrylic matrix (Purolite A850), both of which started in $SO_4^{2-}$ form.
Figure 10:
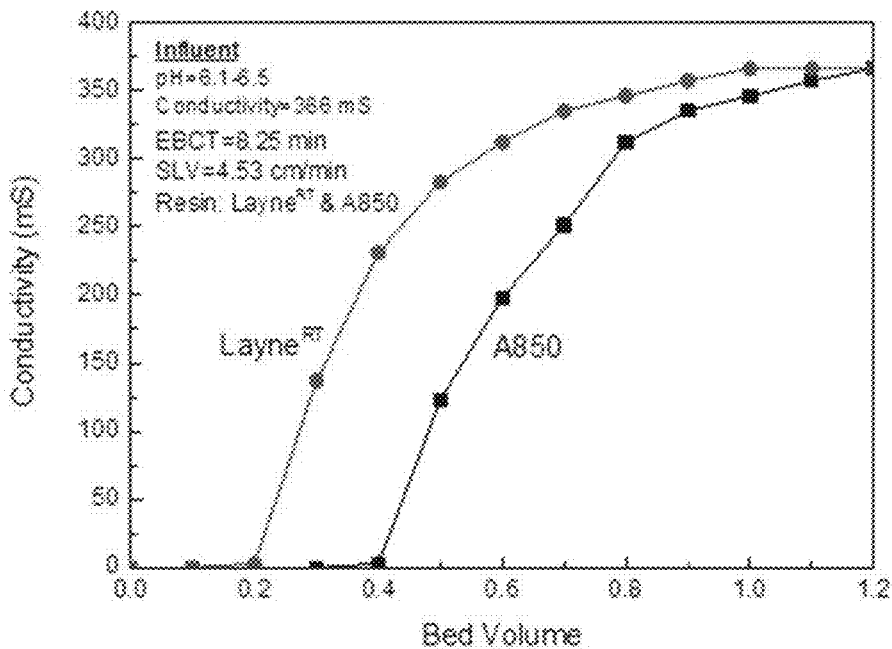
FIG. 10 is an exemplary graph illustrating a comparison of effluent conductivity history during column operation with Marcellus Shale flowback water (2,200 mg/L $Ba^{2+}$) with two different HFO-loaded macroporous strong base anion exchange polymers with polystyrene benzene matrix (LayneRT) and polyacrylic matrix (Purolite A850), both of which started in $SO_4^{2-}$ form.
Figure 11:
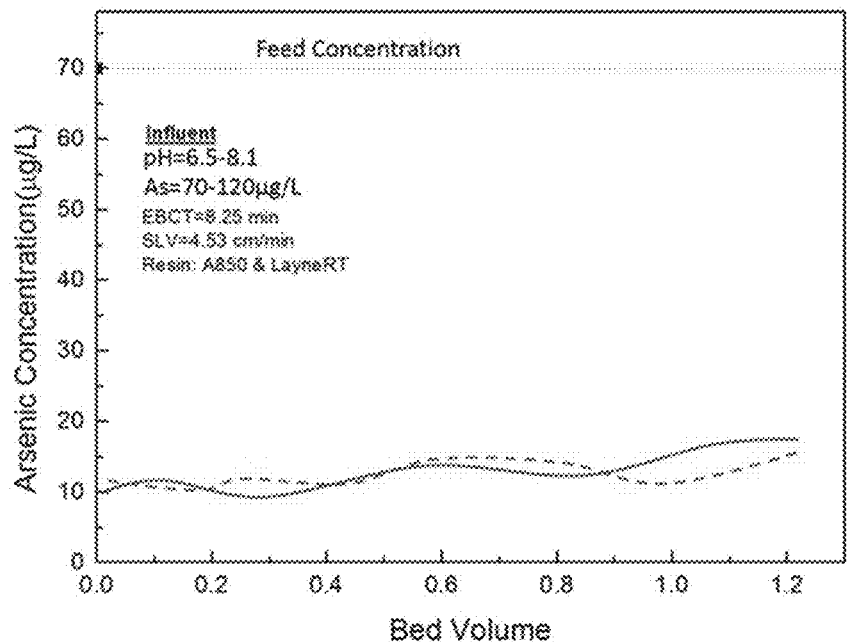
FIG. 11 is an exemplary graph illustrating a comparison of effluent arsenic history after treating Marcellus produced water using two different HFO-loaded macroporous strong base anion exchange polymers with polystyrene benzene matrix (LayneRT) and acrylic matrix (Purolite A850) that were regenerated with AMD. Both resins selectively removed arsenic from a high total dissolved solids (TDS) waste water.
Figure 12:
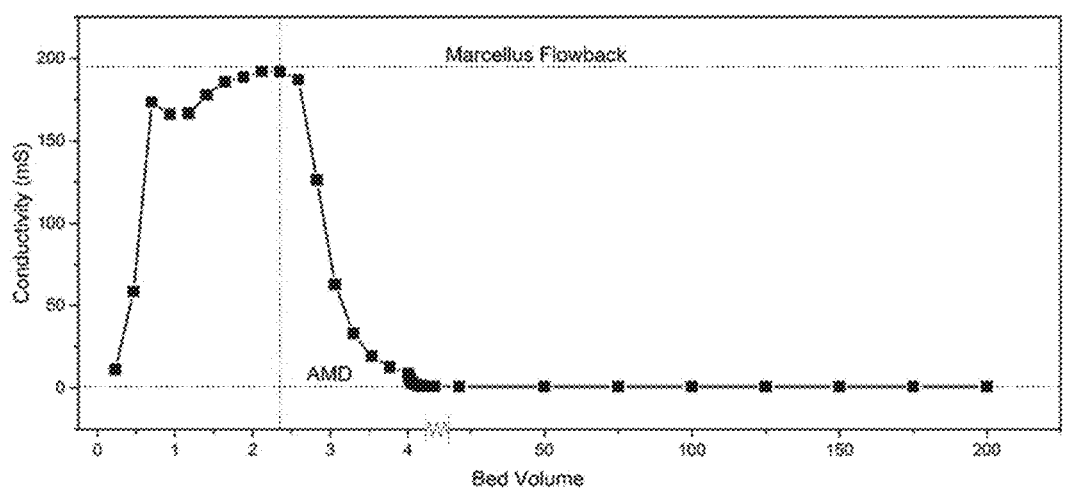
FIG. 12 is an exemplary graph illustrating effluent conductivity during treatment of Marcellus Shale flowback water and subsequent treatment of acid mine drainage with HFO-loaded Purolite A850. The vertical dashed line at Bed Volumes equal to 2.4 indicates when the feed was switched from flowback water to acid mine drainage.

Second Set:

The low concentration sulfate solution used to condition the HFO-loaded resins had the following water chemistry: pH 3.5-4.5, [SO$_4^{2-}$]=1,000 mg/L. FIG. 8 illustrates the effluent sulfate history during conditioning. The total sulfate removed by LayneRT increased versus the high concentration sulfate conditioning stream, while sulfate remained the same for A850. After sulfate conditioning, the sulfate loaded resins treated influent Marcellus produced water with the following water chemistry: pH 5.3, 4,366 meq/L Cl$^-$, 2,668 meq/L Na$^+$, 1,067.5 meq/L Ca$^{2+}$, 150 meq/L Sr$^{2+}$, 237 meq/L Ba$^{2+}$. FIG. 9 illustrates barium effluent histories for column treatment by HFO-loaded anion exchange resins in sulfate-form, and FIG. 10 illustrates the conductivity histories for column operations. FIG. 11 illustrates the arsenic effluent history.

Example 3

Figure 13:
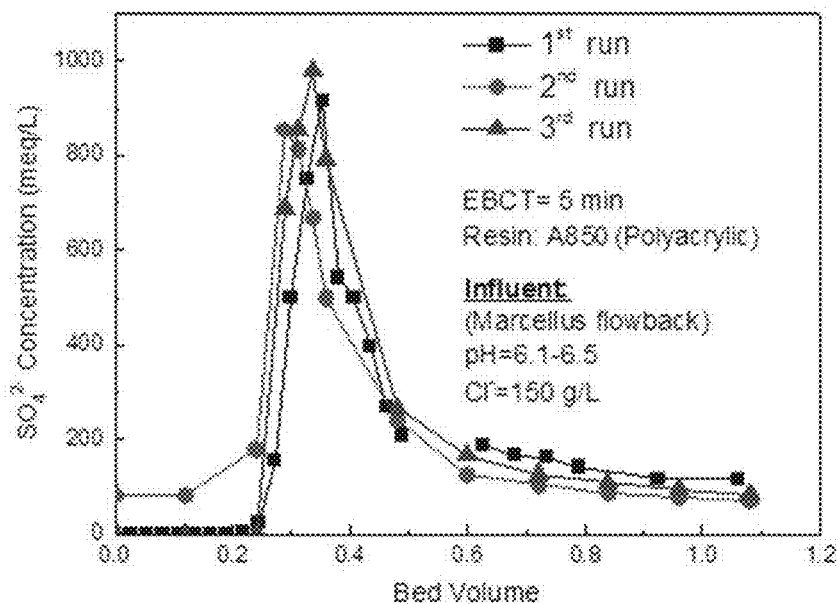
FIG. 13 is an exemplary graph illustrating a comparison of effluent $SO_4^{2-}$ history during numerous cycles of treatment of Marcellus Shale flowback water with HFO-loaded Purolite A850 after conditioning with sulfate-containing AMD.
Figure 14:
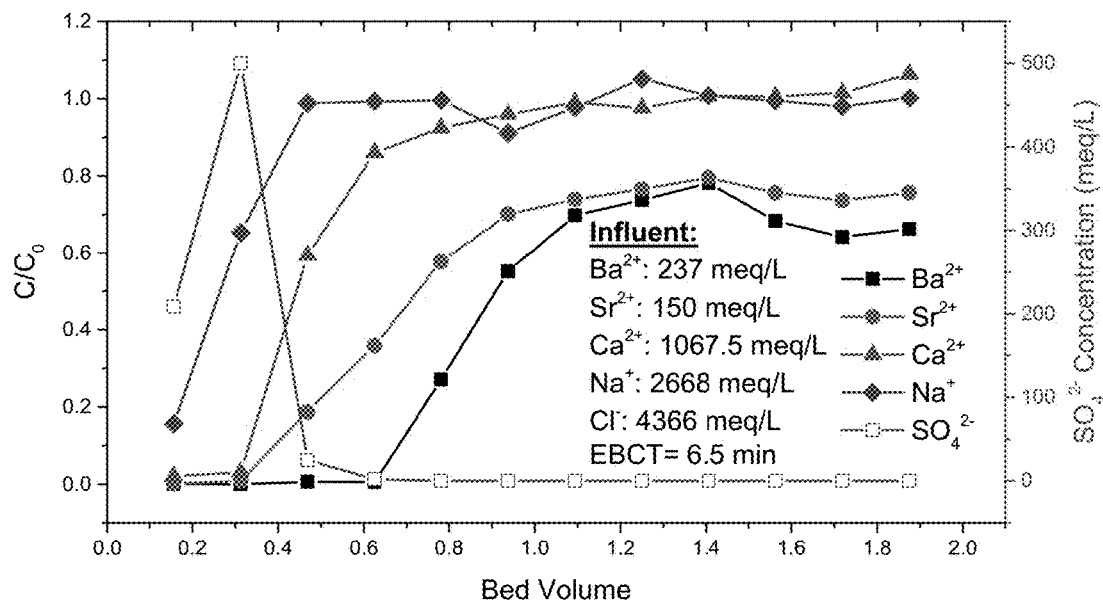
FIG. 14 is an exemplary graph illustrating a comparison of profiles for calcium, sodium, strontium, barium, and sulfate in the effluent from HFO-loaded Purolite A850 upon treatment of Marcellus flowback water. Feed water chemistry and hydraulic conditions of operation are detailed in the Figure.
Figure 15:
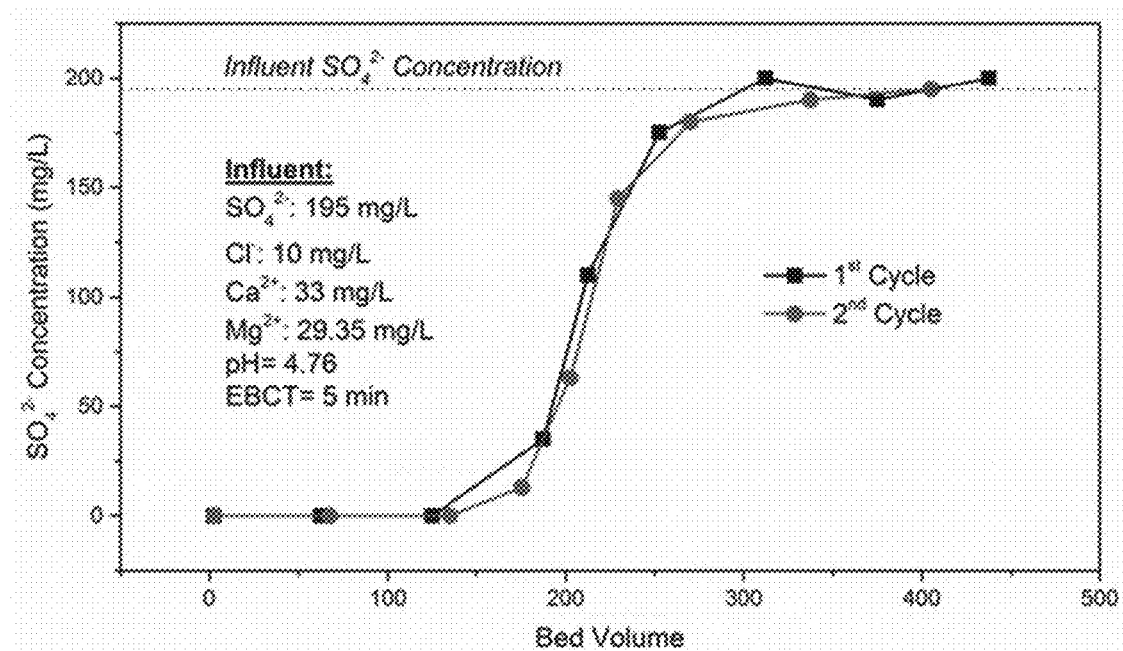
FIG. 15 is an exemplary graph illustrating a comparison of effluent $SO_4^{2-}$ history during numerous cycles of conditioning with sulfate-containing AMD after treating Marcellus Shale flowback water using HFO-loaded Purolite A850.

Purolite A850 was loaded with ferric oxide nanoparticles by internal precipitation reactions to be denser than Marcellus flowback, as seen in FIG. 5. Synthetic acid mine drainage (AMD) was passed through a column of the Purolite A850 to convert the resin into sulfate form. Loading the resin into sulfate-form is a reversible process that can be repeated for numerous cycles (FIG. 13). After being loaded in sulfate form, the resin treats Marcellus flowback water until sulfate stops being produced to an extent that it participates in divalent cation removal. Transitioning from conditioning Purolite A850 with AMD to treating Marcellus flowback requires the resin column to be drained, so that mixing doesn't occur and the treatment cycles are clearly defined. The change in feed water from Marcellus flowback to AMD is demonstrated in FIG. 12 with the red vertical line and the significant changes in conductivity. The effluent sulfate concentration during Marcellus flowback treatment over multiple cycles is in FIG. 13. The complete profile of calcium, strontium, barium, and sulfate for one cycle is in FIG. 14. After breakthrough of sulfate and treatment of barium, AMD is passed through the column to return the resin to sulfate form. The effluent sulfate history, AMD water chemistry, and loading hydraulic conditions are in FIG. 15 for multiple cycles of sulfate conditioning.

After treatment of flowback water or conditioning with AMD, it is desirable that barium or any divalent cation do not precipitate or accumulate inside the ion exchange resins, so that the process may be repeatable for a high number of cycles, or may be sustainable. Energy Dispersive X-ray spectroscopy was performed on the iron-loaded Purolite A850 after treatment of Marcellus flowback water (FIG. 16) and after conditioning with AMD (FIG. 17). No barium was found in the resins at either time, and no chloride was found after sulfate conditioning. No chloride after sulfate conditioning means that the ion exchange was effective and the resin was properly regenerated.

Example 4

Barium removal was also conducted by titration with a sodium sulfate titrant to illustrate methods of the invention. When using a liquid sodium sulfate solution, two different sulfate concentrations (1,000 mg/L, and 4,800 mg/L) were used.

Figure 18:
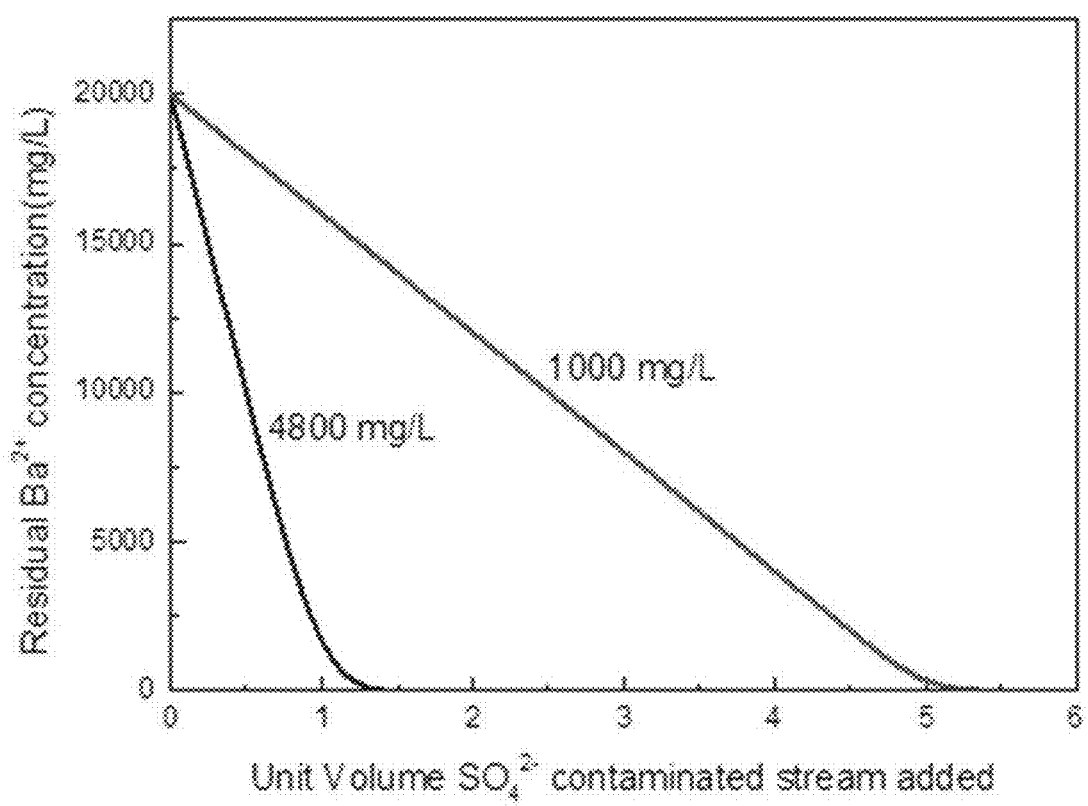
FIG. 18 is an exemplary graph illustrating a comparison of $Ba^{2+}$ concentration during titration of Marcellus Shale flowback water by a $SO_4^{2-}$ containing titrant (4,800 mg/L and 1,000 mg/L).

Barium was used as a surrogate for radium and other divalent cations for an "artificial hydraulic fracturing waste water." 250 mL waste water were contained in two beakers where a 1,000 mg/L SO$_4^{2-}$ titrant and a 4,800 mg/L SO$_4^{2-}$ titrant were applied. FIG. 18 illustrates the barium concentration within the beaker. The volume of sulfate containing water required to precipitate the barium was dependent on the barium concentration. The removal efficiency was reduced as the concentration of SO$_4^{2-}$ decreased. Additional sodium and volume were added to the "artificial radioactive waste water" with this method, and yet the effluent still required advanced treatment before reuse. The sulfate chemical requirement and cost are additional barriers for this method, due to the absence of an ion exchanger and the ability to use readily available lower concentration sulfate containing wastes.

Figure 19:
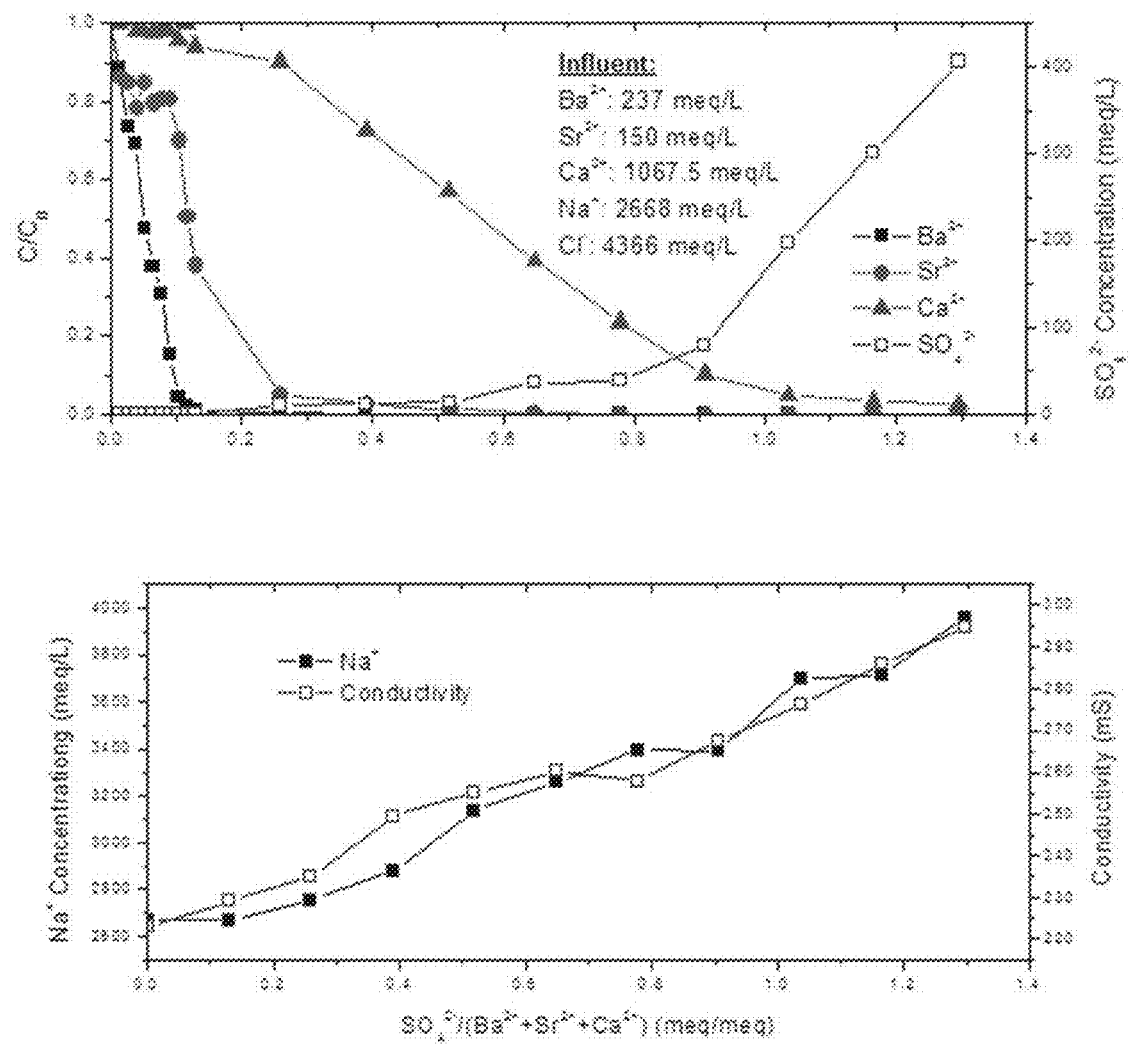
FIG. 19 is a set of exemplary graphs illustrating (top) relative concentrations of $Ba^{2+}$, $Sr^{2+}$, and $Ca^{2+}$ versus initial concentrations as a function of equivalents of sulfate per equivalent of divalent cations when dosing solid sodium sulfate into Marcellus flowback water; and (bottom) the changing sodium and conductivity during sodium sulfate addition. The different $K_{sp}$ values for the different sulfate precipitates caused cations to precipitate after different amounts of sulfate were added and at different solution concentrations of sulfate.
Figure 20:
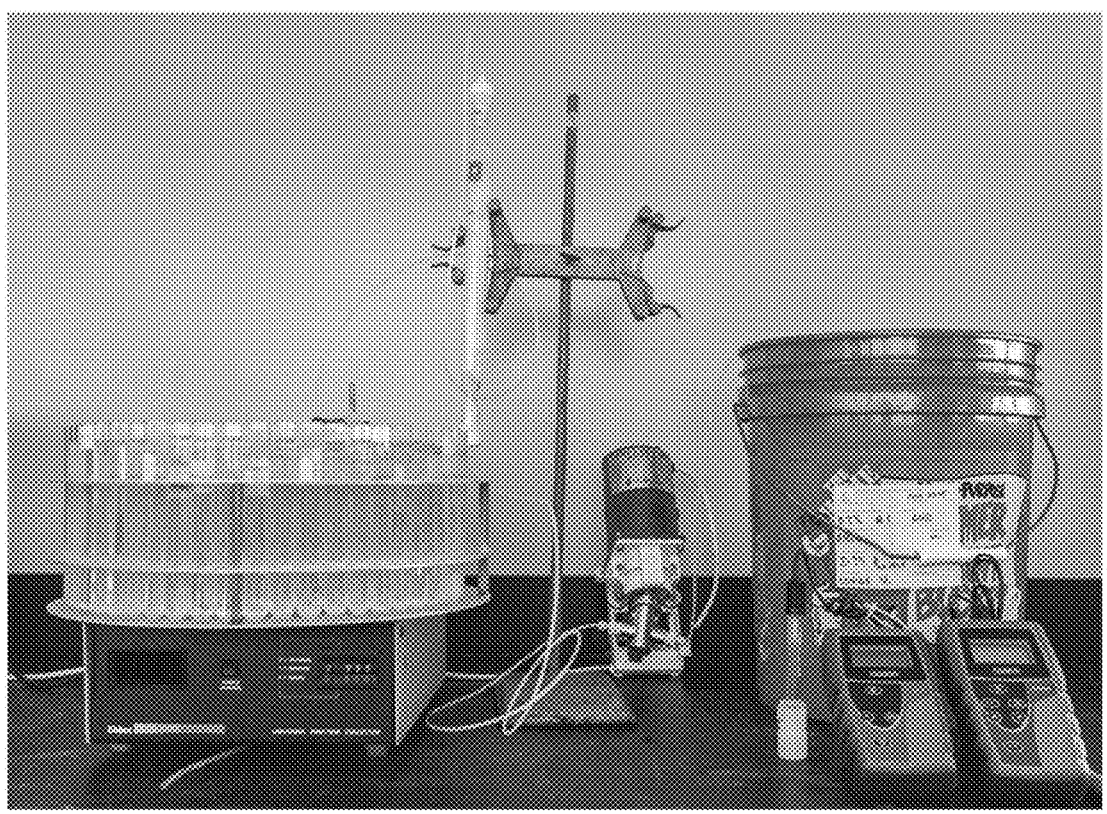
FIG. 20 is a non-limiting illustration of a laboratory setup with feed tank, anion exchange column, step pump, and fractional collector. Conductivity meter and pH meter on the right side were used for effluent monitoring during the operation.

The addition of Na$_2$SO$_4$ to hydraulic fracturing flowback fluids was duplicated with the addition of solid sodium sulfate (Na$_2$SO$_4$.12H$_2$O). Use of solid sodium sulfate corresponds to no dilution and volume increase of the initial waste water. Sequential precipitation of the different divalent cations occurs and is based on the solubility product (K$_{SP}$) and the initial solution concentration. Conductivity and solution concentrations of sodium, calcium, strontium, barium, and sulfate are illustrated in FIG. 19. Sodium and conductivity increased during the addition of sodium sulfate, due to the sodium present in sodium sulfate.

The disclosures of each and every patent, patent application, and publication cited herein are hereby incorporated herein by reference in their entireties.

Although the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A method of desalinizing a primary waste water comprising dissolved divalent cations, the method comprising:
   (i) providing an untreated secondary waste water comprising dissolved sulfate ions;
   (ii) contacting the untreated secondary waste water with an anion exchange resin, whereby the ion exchanging resin is conditioned to sulfate form, thereby forming a treated secondary waste water and an anion exchange resin comprising sulfate ions,
   wherein the treated secondary waste water has a lower concentration of dissolved sulfate ions as compared to the untreated secondary waste water,
   (iii) contacting the anion exchange resin comprising sulfate ions with an untreated primary waste water comprising dissolved divalent cations, wherein at least a fraction of the divalent cations forms an insoluble sulfate salt precipitate, thereby forming a treated primary waste water is formed,
   wherein the treated primary waste water has a lower concentration of dissolved divalent cations as compared to the untreated primary waste water,
   (iv) separating the treated primary waste water from the insoluble sulfate salt precipitate by a method selected from the group consisting of decantation, filtration, and centrifugation.

2. The method of claim 1, wherein the dissolved divalent cations comprise at least one selected from the group consisting of $Ca^{2+}$, $Mg^{2+}$, $Sr^{2+}$, $Ba^{2+}$, and $Ra^{2+}$.

3. The method of claim 1, wherein the anion exchange resin comprises at least one selected from the group consisting of a gel anion exchange resin and a macroporous anion exchange resin.

4. The method of claim 3, wherein the anion exchange resin comprises a strong base anion exchange resin.

5. The method of claim 4, wherein the strong base anion exchange resin comprises at least one quaternary ammonium functional group.

6. The method of claim 1, wherein the untreated primary waste water comprises hydraulic fracturing waste water.

7. The method of claim 1, wherein the untreated secondary waste water comprises acid mine drainage.

8. The method of claim 1, wherein the treated primary waste water formed in step (iii) has lower total dissolved solids (TDS) than the untreated primary waste water.

9. The method of claim 1, wherein step (ii) further comprises separating the anion exchange resin conditioned to sulfate form and the treated secondary waste water.

10. The method of claim 9, wherein the separation is performed using at least one method selected from the group consisting of decantation, filtration and centrifugation.

11. The method of claim 1, wherein step (iii) further comprises separating the anion exchange resin and the treated waste water.

12. The method of claim 11, wherein the separation is performed using at least one method selected from the group consisting of decantation, filtration and centrifugation.

13. The method of claim 1, wherein the anion exchange resin further comprises at least one metal oxide selected from the group consisting of aluminum, copper, iron, manganese, and zirconium.

14. The method of claim 13, wherein the anion exchange resin has a higher density than any one of the liquids selected from the group consisting of untreated primary waste water, treated primary waste water, untreated secondary waste water, and treated secondary waste water.

15. The method of claim 13, wherein the untreated primary waste water comprises arsenic, wherein the anion exchange resin further comprises at least one metal oxide selected from the group consisting of aluminum, iron and zirconium, and wherein the metal oxide adsorbs arsenic in the untreated primary waste water, whereby the treated primary waste water has a lower arsenic concentration than the untreated primary waste water.

16. The method of claim 1, wherein essentially no additional chemicals are used in steps (i)-(iv).

17. The method of claim 1, wherein the sequence of steps (i)-(iv) is repeated at least two times using the same anion exchange resin.

18. The method of claim 1, wherein the anion exchange is in the form of a packed bed within a column.

* * * * *